(12) United States Patent
Schmitt

(10) Patent No.: US 10,144,278 B2
(45) Date of Patent: Dec. 4, 2018

(54) AIR GUIDE SYSTEM FOR A MOTOR VEHICLE

(71) Applicant: Röchling Automotive SE & Co. KG, Mannheim (DE)

(72) Inventor: Andreas Schmitt, Abenheim (DE)

(73) Assignee: Röchling Automotive SE & Co. KG, Mannheim (DE)

(*) Notice: Subject to any disclaimer, the term of this patent is extended or adjusted under 35 U.S.C. 154(b) by 308 days.

(21) Appl. No.: 14/187,493

(22) Filed: Feb. 24, 2014

(65) Prior Publication Data

US 2014/0248828 A1    Sep. 4, 2014

(30) Foreign Application Priority Data

Mar. 1, 2013 (DE) ........................ 10 2013 203 563

(51) Int. Cl.
*B60H 1/34* (2006.01)
*B60K 11/08* (2006.01)

(52) U.S. Cl.
CPC .......... *B60K 11/085* (2013.01); *B60H 1/3421* (2013.01); *B60K 11/08* (2013.01); *B60H 2001/3464* (2013.01)

(58) Field of Classification Search
CPC ....... B60K 11/085; B60K 11/08; B60R 19/52; B60R 2019/525
(Continued)

(56) References Cited

U.S. PATENT DOCUMENTS 5,730,652 A * 3/1998 Van Becelaere ......... F24F 11/04
                                                    137/12
8,215,703 B2    7/2012 Goenueldinc
(Continued)

FOREIGN PATENT DOCUMENTS

CN    202038381 U    11/2011
CN    102407835 A    4/2012
(Continued)

OTHER PUBLICATIONS

Search Report of the German Priority Application DE 10 2013 203 563.2 dated Oct. 11, 2013, 4 pages.
(Continued)

*Primary Examiner* — Steven B McAllister
*Assistant Examiner* — Ko-Wei Lin
(74) *Attorney, Agent, or Firm* — Prince Lobel Tye LLP

(57) ABSTRACT

Air guide system (10) for a motor vehicle, comprising a support structure (12) having an air passage opening (14), an air damper assembly (16) having at least one air damper (18) which is provided on the support structure (12) so that it can pivot about a damper axis (20) between a closed position (FIG. 1(a)) and an open position (FIG. 1(c)) in order to adjust a flow cross-section of the air passage opening (14), the flow cross-section being minimal in the closed position (FIG. 1(a)), and the air damper (18) comprising two opposing damper longitudinal edges (22) extending substantially in the direction of the damper axis (20), and an air guide means (24) for guiding air (L) flowing through the air passage opening (14) downstream of the air passage opening (14), wherein the air guide means (24) comprises one or more air guide walls (26), an air guide wall (26) of the air guide means (24) being assigned to at least one, preferably each, air damper (18) of the air damper assembly (16), and, for the respective air damper (18), the assigned air guide wall (26) extending from an air-damper-side edge (28) of the air guide wall (26) away from the damper axis (20) of the air damper (18), and, in a central region of the damper axis, which extends over at most 80 percent of the length (b) of the damper axis (20), the minimum distance (d) of the damper axis (20) of the air damper (18) in the closed position to the air-damper-side edge (28) of the assigned air guide wall (26) is less than the average distance (a) between the damper longitudinal edges (22), preferably less than half,
(Continued)

Figure 3:
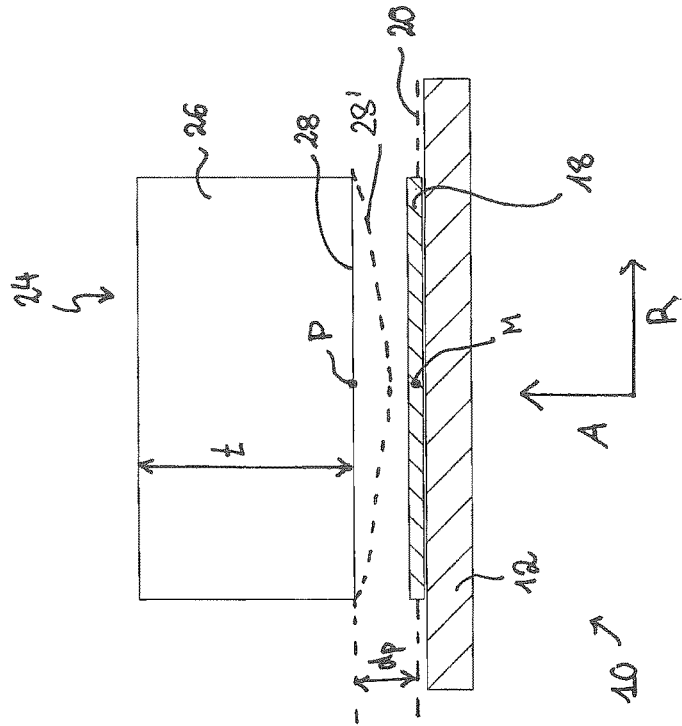

particularly preferably less than a tenth of the average distance (a) between the damper longitudinal edges (22).

13 Claims, 2 Drawing Sheets

(58) Field of Classification Search
USPC ....... 454/335, 143, 154–155, 166, 284, 330; 180/68.1
See application file for complete search history.

(56) References Cited

U.S. PATENT DOCUMENTS

| | | | |
|---|---|---|---|
| 8,485,296 B2 | 7/2013 | Charnesky et al. | |
| 8,517,130 B2* | 8/2013 | Sakai | B60K 11/085 |
| | | | 180/68.1 |
| 8,807,166 B2* | 8/2014 | Charnesky | B60K 11/085 |
| | | | 137/601.08 |
| 2010/0243351 A1 | 9/2010 | Sakai | |
| 2012/0071075 A1 | 3/2012 | Wolf | |
| 2012/0305818 A1* | 12/2012 | Charnesky | B60K 11/085 |
| | | | 251/212 |

FOREIGN PATENT DOCUMENTS

| | | |
|---|---|---|
| CN | 102806840 A | 12/2012 |
| DE | 20 2005 010 683 U1 | 9/2005 |
| DE | 10 2011 113 227 A1 | 3/2012 |
| DE | 10 2012 209 074 A1 | 12/2012 |

OTHER PUBLICATIONS

Office Action issued for the Chinese Patent Application No. 201410070603.9 dated Mar. 3, 2017 with English translation (10 pages).

\* cited by examiner

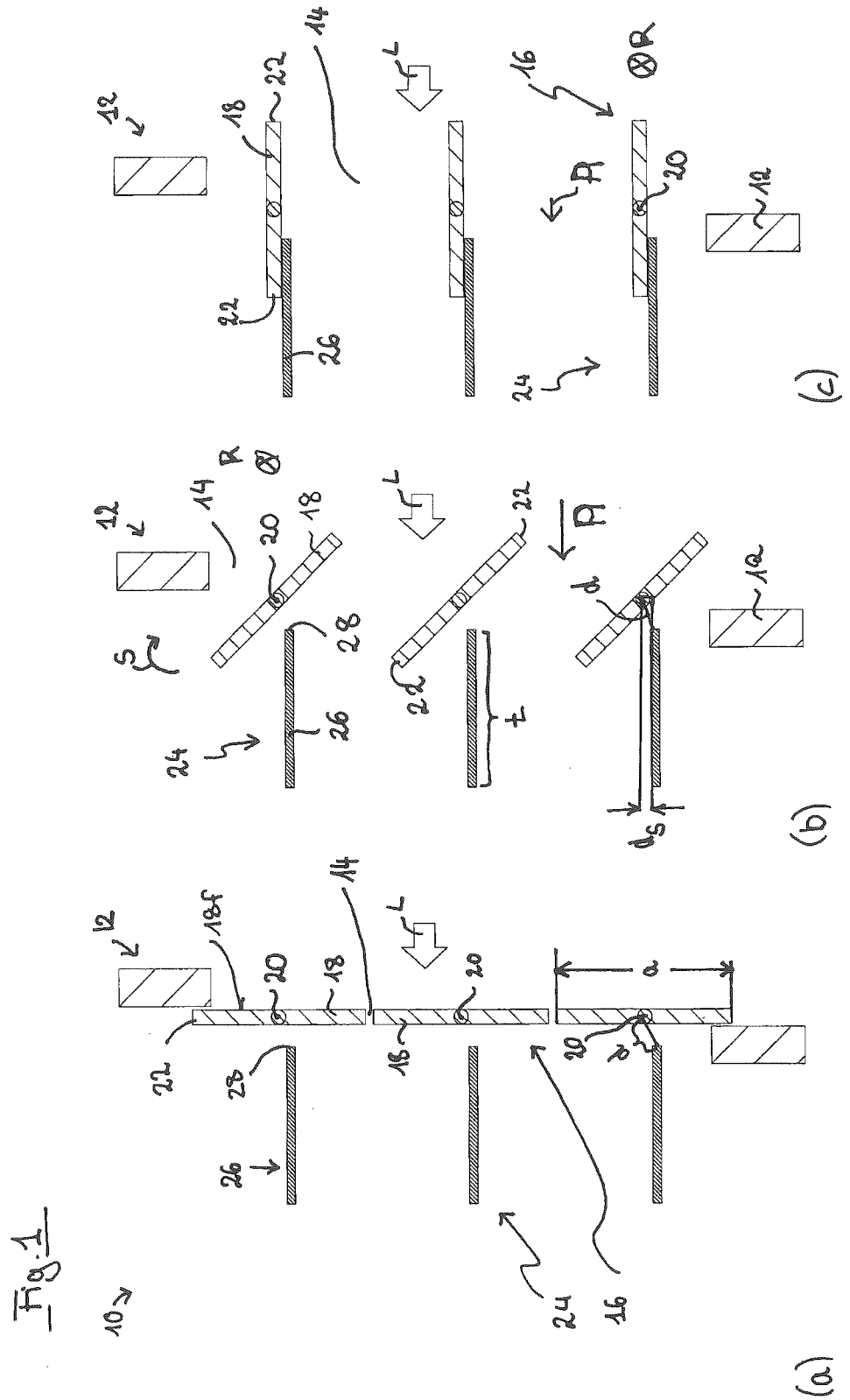

AIR GUIDE SYSTEM FOR A MOTOR VEHICLE

CROSS REFERENCE TO RELATED APPLICATION

This application claims the benefit of German Patent Application No. DE 10 2013 203 563.2 filed on Mar. 1, 2013, the disclosure of which is incorporated herein in its entirety by reference.

The present invention relates to an air guide system for a motor vehicle, comprising a support structure having an air passage opening, an air damper assembly having at least one air damper which is provided on the support structure so that it can pivot about a damper axis between a closed position and an open position in order to adjust a flow cross-section of the air passage opening, the flow cross-section being minimal in the closed position, and the air damper comprising two opposing damper longitudinal edges extending substantially in the direction of the damper axis, and an air guide means for guiding air flowing through the air passage opening downstream of the air passage opening.

Air guide systems of this type are sufficiently known from experience and are used for selectively cooling units in the inner region of the vehicle. Air guide systems comprising pivotable air dampers are used for example in the front region of motor vehicles, wherein, depending on the position of the air dampers, a different proportion of the air flowing against the front of the vehicle during operation is guided to the engine compartment as cooling air. If cooling the engine is not absolutely necessary, the air dampers can be closed, which reduces the flow resistance of the motor vehicle and thus the fuel consumption thereof.

The design of air guide systems of this type significantly influences the flow resistance and thus the fuel consumption of the motor vehicle.

Due to the air flowing against the air damper assembly and/or through the air passage opening during operation, considerable forces can act on the air dampers. As flow simulations and tests by the applicant show, a relatively large torque acts in the closing direction (that is to say towards the closed position) in particular on air dampers which are flowed around and are (slightly) open, wherein the torque in the closing direction could be explained for example by the Bernoulli effect, without wanting to be bound thereto, however.

In order to drive the adjusting movement or in order to maintain a desired position of the air dampers, during operation, in particular at a high driving speed and thus in the event of a high flow speed, actuators are therefore required that can output relatively large torques. Actuators of this type are accordingly heavy, large and require a lot of energy.

In this context, the problem addressed by the present invention is thus that of developing the known air guide system so that actuators having a smaller maximum torque can be used.

This problem is solved according to the invention in that the air guide means comprises one or more air guide walls, an air guide wall of the air guide means being assigned to at least one, preferably each air damper of the air damper assembly, and for each air damper, the assigned air guide wall extending from an air-damper-side edge of the air guide wall away from the damper axis of the air damper in the closed position, and, in a central region of the damper axis which extends over at most eight percent (80%) of the length of the damper axis, the minimum distance of the damper axis of the air damper in the closed position to the air-damper-side edge of the assigned air guide wall being less than the average distance between the damper longitudinal edges, preferably less than half, particularly preferably less than a tenth of the average distance between the damper longitudinal edges.

In this case, the length of the damper axis is understood to mean the measurement of the air damper along the damper axis, or, if the damper axis does not extend through the air damper, the measurement of the distance on the damper axis which corresponds to the measurement of the air damper along the damper axis, for example by projection. The midpoint of the damper axis is understood to mean the midpoint of the air damper along the damper axis or the midpoint of the above-mentioned distance, i.e. the axial longitudinal centre of the damper axis or the air damper, and a central region of the damper axis is understood to be a region of the damper axis which is centred on the midpoint thereof.

The pivotal mounting of the air damper on the support structure should not exclude the adjusting movement between the open position and the closed position from including or being a superposition of a pivoting movement about the damper axis with a displacement movement of the damper axis relative to the support structure. In many cases, the at least one air damper is in any case mounted so that the damper axis thereof is stationary relative to the support structure.

As a result of the air guide wall being arranged, according to the invention, downstream of the damper axis and the air-damper-side edge thereof being arranged close to the damper axis, the free flow around the open and impinged air damper is disrupted, and the torque acting in the closing direction is thus reduced.

Simulation calculations and tests by the applicant have shown that by means of a design of the air guide system according to the invention, the maximum torque required for the actuators can be considerably reduced, even by up to approximately fifty percent.

An additional advantageous effect of the air guide system according to the invention consists in the fact that the air guide wall arranged close to the damper axis and downstream thereof reduces bending, resulting from the flow of air against the impinged air damper in the closed position, and thereby reduces undesired leakage and thus the flow resistance of the vehicle.

By limiting the minimum distance to the central region of the damper axis, which preferably extends over at most 80% of the length of the damper axis, cases should be excluded in which a small distance between the damper axis and a stationary component of the air guide system (e.g. guide structures for guiding the adjusting movement) is only present in the edge region of the damper axis, and therefore this component only contributes to controlling the air flowing through the air passage opening to a small extent.

The air dampers conventionally have a substantially rectangular shape or are based on a basic rectangular shape having two damper longitudinal edges extending substantially in the direction of the damper axis and two damper transverse edges crossing the damper axis or extending skew (frequently orthogonal) thereto. The average distance between the damper longitudinal edges should be understood to mean, in particular in the case of deviations from the rectangular shape, the average value which is formed along the entire length of the damper axis.

Particularly effective prevention of the above-described bending of the closed air damper due to the flow of air against it during operation can be achieved by arranging the air guide wall assigned to the respective air damper in the region of the midpoint of the damper axis, particularly close to said axis, i.e. in that for at least one, preferably for each, air damper, the distance of the midpoint of the damper axis of the air damper in the closed position from the air-damper-side edge of the assigned air guide wall is less than the average distance between the damper longitudinal edges, preferably less than half, particularly preferably less than a tenth of the average distance between the damper longitudinal edges.

According to an advantageous development, the component perpendicular to the impingement direction of the minimum distance in the central region of the damper axis or of the distance of the midpoint of the damper axis to the respective air-damper-side edge of the assigned damper axis can be less than a quarter of the average distance between the damper longitudinal edges.

The impingement direction in this case is the direction in which the air damper assembly is impinged upon during the operation of the motor vehicle, i.e. the direction in which air flows against the air damper assembly. The impingement direction frequently extends substantially perpendicular to the surface of the impinged air damper in the closed position.

Due to the fact that the assigned air guide wall is arranged at a similar or substantially equal height (perpendicular to the impingement direction) to the damper axis of the air damper in the closed position and close thereto, the air damper can "roll" on the assigned air guide wall during the opening process, which stabilises the opening movement.

For the above-mentioned purpose and in order to effectively disrupt the free flow around the air damper, additionally or alternatively, for at least one, preferably for each, air damper, the assigned air guide wall can extend substantially parallel to the damper axis in the closed position of the air damper in at least one region which comprises the point of the air-damper-side edge of the air guide wall which is closest to the midpoint of the damper axis. The air guide wall preferably extends predominantly or completely substantially parallel to the damper axis.

For, at least one, preferably for each, air damper, the assigned air guide wall can extend at least in the region substantially orthogonal to a damper surface of the air damper in the closed position, which region comprises the point of the air-damper-side edge of the air guide wall which is closest to the midpoint of the damper axis in the closed position of the air damper. By orthogonally orienting the air guide wall relative to the damper surface in the closed position, this allows a high air flow rate in the open position of the air damper. In addition, this favours the above-mentioned "rolling" of the air damper on the assigned air guide wall.

In particular, at least one, preferably each, air damper can be in contact with the assigned air guide wall in the open position, and therefore the air guide wall acts as a stop for the corresponding air damper. The open position of the air dampers can thereby be stabilised.

An effective disruption of the free flow around the air dampers and thus an effective reduction of the torque in the closing direction can be achieved in that for at least one, preferably for each, air damper, the assigned air guide wall extends along at least eighty percent (80%) of the length of the damper axis, preferably along the entire length of the damper axis.

Alternatively or additionally, for this purpose, the assigned air guide wall can also extend, for at least one, preferably for each, air damper, proceeding from the air-damper-side edge, perpendicular to the damper axis of the air damper, over a length which is at least as great as the average distance between the damper longitudinal edges.

The required number of assembly steps can be reduced, and thus the production of the air guide system can be designed to be more effective, in that the air guide means is formed in one piece with the support structure, for example by injection moulding. In addition, undesired leakage can also be reduced thereby.

A large maximum air flow rate and effective control of the air impinging upon the vehicle can be achieved in that the air damper assembly comprises a plurality of air dampers which are arranged mutually parallel in a row perpendicular to the direction of the damper axes in the closed position of the air dampers.

In so doing, in particular at least two, preferably all, of the air guide walls which are assigned to the air dampers arranged in a row perpendicular to the direction of the damper axes in the closed position can extend mutually parallel at least in one region comprising the corresponding air-damper-side edge, whereby a frequently desired parallel air flow downstream of the air passage opening can be achieved.

Simplifying the assembly can additionally be achieved in that the air guide means comprises a plurality of air guide walls and is formed in one piece or pre-assembled into a single unit, and in that the one-piece or pre-assembled air guide means can be connected to the support structure, for example by means of snap-on connections.

Figure 2:
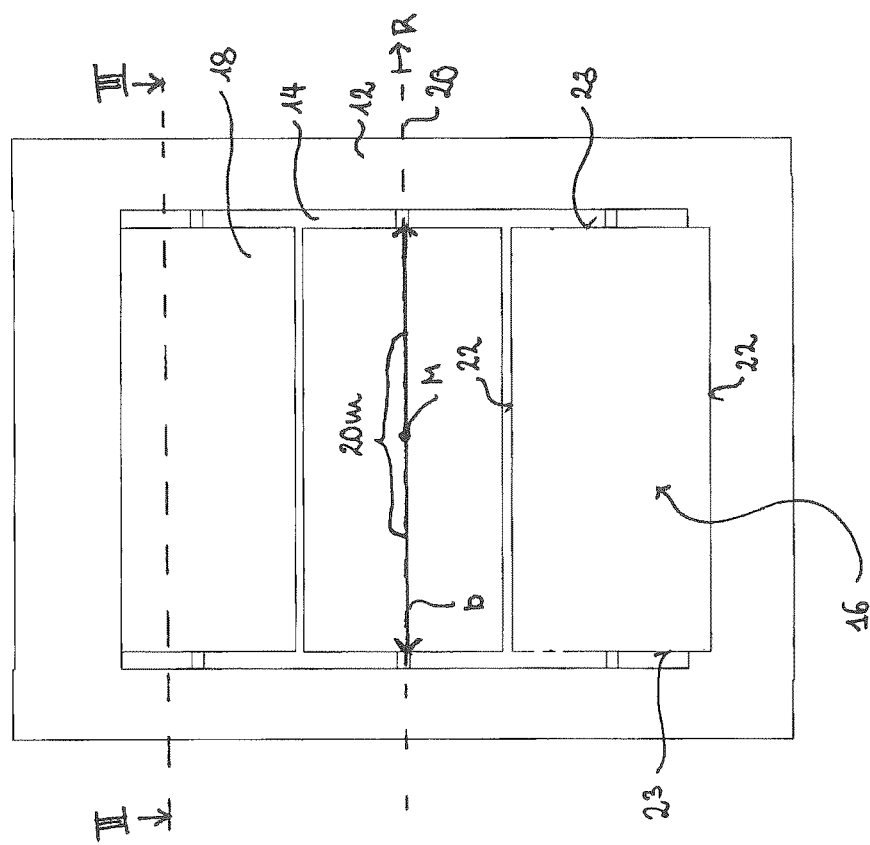

The present invention is described in greater detail below with reference to the accompanying drawings which illustrate a preferred embodiment of the invention, in which:

FIG. 1 shows, in partial views (a), (b) and (c), an embodiment of the present invention in which the air dampers are located in the closed position (a), in an intermediate position (b) and in the open position (c) respectively, FIG. 2 is a front view of the object in FIG. 1(*a*), and FIG. 3 is a sectional view of the object in FIG. 2 along the line III-III in FIG. 2.

All of the drawings are greatly simplified schematic drawings which are used to explain the principle of the invention and which in particular are not to be seen as being to scale.

Details which are not essential to the comprehension of the invention and the implementation of which are known to a person skilled in the art, for example the precise mounting of the air dampers on the support structure, have not been shown.

So as not to overload the drawings, where there are several similar components in a drawing, not all of the components have been given reference signs.

FIG. 1 shows an embodiment of an air guide system 10 for a motor vehicle which is not shown in greater detail in the drawings. The air guide system 10 comprises a support structure 12, which is only shown in sections in the drawings, comprising an air passage opening 14 (cf. FIG. 1(*c*) and FIG. 2).

In the region of the air passage opening 14, there is an air damper assembly 16 comprising at least one air damper 18 (in the present case three air dampers 18) which is provided on the support structure 12 so that it can pivot in each case about a damper axis 20 between a closed position shown in FIG. 1(*a*) and an open position shown in FIG. 1(*c*) in order to adjust a flow cross-section of the air passage opening 14.

In the present example, the damper axes 20 are stationary relative to the support structure 12. However, this is not absolutely necessary. It can also be provided that the air dampers carry out a combined pivoting and displacement movement in order to adjust between the closed position and the open position, in which the damper axes are displaced.

As is clear from a comparison of the partial views (a) to (c), the flow cross-section in the closed position is minimal, and in the open position it can be at the maximum.

It can be seen most clearly in FIG. 2 that the air dampers 18 each comprise two opposing damper longitudinal edges 22 extending substantially in the direction of the damper axis 20, having an average distance a between them, and two damper transverse edges 23 which extend substantially orthogonal to the damper longitudinal edges 22.

In the present example, the air dampers 18 have a very simple plate-shaped and rectangular design, but numerous variations thereof are possible.

Departing from the representation in the drawings, it can be provided for example that the air dampers overlap in the region of the damper longitudinal edges 22 in the closed position in order to increase the tightness of the air guide system in the closed position.

In addition, the air guide system 10 according to the invention comprises an air guide means 24 for guiding air L (symbolised in FIGS. 1(a) to 1(c) by an arrow) flowing through the air passage opening 14 downstream of the air passage opening 14. The air guide means 24 is also greatly simplified in the accompanying drawings and is only shown in sections.

In this case, the air guide means 24 comprises a plurality of air guide walls 26, wherein an air guide wall 26 of the air guide means 24 is assigned to at least one, in the present case each, air damper 18 of the air damper assembly 16.

According to the invention, for each air damper 18, the assigned air guide wall 26 extends from an air-damper-side edge 28 of the air guide wall 26 away from the damper axis 20 of the air damper 18 (e.g. in impingement direction A) and is arranged close to the damper axis 20 so that in a central region 20m of the damper axis 20, which extends over at most 80% of the length b of the damper axis (cf. FIG. 2), the minimum distance d of the damper axis 20 of the air damper 18 in the closed position to the air-damper-side edge of the assigned air guide wall 26 is less than the average distance a between the damper longitudinal edges 22 of the air damper 18, in the present case considerably less.

In particular, the component ds of d perpendicular to the impingement direction A (cf. FIG. 1(b)) can be less than approximately a quarter of the average distance a between the damper longitudinal edges 22.

Due to the fact that the air guide walls 26 are each arranged close to the damper axes 20 downstream of the air passage opening, when the air dampers 18 are open and impinged upon, as shown for example in FIG. 1(b), the free flow around the air dampers 18 is disrupted, and thus the torque otherwise acting in the closing direction S when the air dampers are slightly open is considerably reduced. In this case, simulation calculations predict a stall on the air damper.

If the air guide walls 26 are arranged close enough to the damper axes 20 in the closed position, the air dampers 18 can thus "roll" on the assigned air guide walls 26 in a supported manner during the adjusting movement out of the closed position and towards the open position, which stabilises the opening movement.

In addition, it can be provided, as shown in FIG. 1(c), that the air guide walls 26 form a stop for the air dampers 18 in the open position, so that the air dampers 18 are in contact with the assigned air guide walls 26 in the open position, by means of which the air dampers are stabilised in the open position.

In the embodiment shown, the air guide walls 26 extend substantially parallel to the damper axes 20 of the respective air dampers 18 (cf. FIG. 3) at least in the region close to the air dampers in the direction R of the damper axes 20 substantially over the entire length b of the damper axes 20 (cf. FIG. 2) and in a flow direction D over a length t which is at least as great as the average distance a between the damper longitudinal edges 22.

The air guide walls 26 can be integrated into the support structure 12 and in particular can be formed in one piece therewith, which is not shown in the drawings due to the greatly schematised representation. Alternatively it is possible for example for the air guide walls 26 to be interconnected or formed in one piece and thus to form a single unit which can be connected to the support structure 12, for example by means of clipping on.

It can be provided in particular (for example in the case of a non-straight shape of the air-damper-side edge of the air guide wall) that the assigned air guide wall 26 is arranged at the midpoint M of the damper axis, particularly close to the damper axis 20, in order to effectively prevent the air damper 18 from bending in the closed position and to thereby increase the tightness. A possible shape of a corresponding air-damper-side edge is shown in FIG. 3 as a dashed line and has the reference sign 28'. The sectional view in FIG. 3 only shows the proportion dp of the distance d parallel to the impingement direction A.

Tests by the applicant have confirmed the reduced torque in the closing direction for the air guide systems according to the invention that was predicted in simulation calculations. In a specific case, the torque in the air guide system according to the invention could be reduced by 50% relative to a conventional air guide system.

Therefore, for example lighter and cheaper actuators can be used, or the air guide system can still be reliably operated with the same actuators at higher maximum speeds.

The invention claimed is:

1. An air guide system for a motor vehicle, comprising:
a support structure having an air passage opening;
an air damper assembly having at least one air damper supported on the support structure and configured to pivot about a damper axis between a closed position and an open position to adjust a flow cross-section of the air passage opening, each air damper comprising two opposing damper longitudinal edges extending substantially in the direction of the damper axis; and
one or more air guide walls for guiding air flowing through the air passage opening downstream of the air passage opening, each air guide wall being associated with one air damper of the air damper assembly such that each air guide wall and its associate air damper form an air guiding surface when the air damper is in the open position, wherein the air guide wall extends from an air-damper-side edge of the air guide wall away from the damper axis of the associated air damper in the closed position, and wherein, in a central region of the damper axis extending up to 80 percent of the length of the associated damper along its damper axis, the minimum distance from the air-damper-side edge of the air guide wall to the damper axis of the associated air damper in the closed position is less than an average distance between the damper longitudinal edges of the associated air damper, and wherein at least one of the one or more air guide walls has a length corresponding to at least 80 percent of the length of the associated air damper along its damper axis.

2. Air guide system according to claim 1, wherein at the midpoint (M) of the damper axis of the associated air damper, the distance from the air-damper side edge of the guide wall to the damper axis of the associated air damper in the closed position is less than the average distance (a) between the damper longitudinal edges.

3. Air guide system according to claim 1, wherein a component (ds) of the minimum distance from the air-damper-side edge of the air guide wall to the damper axis of the associated air damper that is perpendicular to the impingement direction (A) is less than a quarter of the average distance (a) between the damper longitudinal edges.

4. Air guide system according to claim 1, wherein for at least one air damper, the associated air guide wall extends substantially parallel to the damper axis at least in one region, which comprises a point of the air-damper-side edge of the air guide wall that is closest to a midpoint of the damper axis in the closed position of the air damper.

5. Air guide system according to claim 1, wherein for at least one air damper, the associated air guide wall extends substantially orthogonal to a damper surface of the air damper in the closed position, at least in a region, which comprises a point of the air-damper-side edge of the assigned air guide wall that is closest to a midpoint of the damper axis in the closed position of the air damper.

6. Air guide system according to claim 1, wherein at least one air damper is in contact with the associated air guide wall in the open position.

7. Air guide system according to claim 1, wherein for at least one air damper, the associated air guide wall extends, proceeding from the air-damper-side edge, perpendicular to the damper axis of the air damper in the closed position, over a length that is at least as great as the average distance between the damper longitudinal edges.

8. Air guide system according to claim 1, wherein the one or more air guide walls are formed in one piece with the support structure.

9. Air guide system according to claim 1, wherein the air damper assembly comprises a plurality of air dampers which are arranged mutually parallel and in a row perpendicular to the direction of the damper axes in the closed position.

10. Air guide system according to claim 9, comprising two or more air guide walls extending mutually parallel at least in a region comprising the respective air-damper-side edge of each air guide wall.

11. Air guide system according to claim 1, wherein the one or more air guide walls comprise a plurality of air guide walls formed in one piece or pre-assembled into a single unit, and wherein the air guide means can be connected to the support structure.

12. The air guide system of claim 1, wherein, in the central region of the damper axis, the minimum distance from the air-damper-side edge of the air guide wall to the damper axis of the associated air damper in the closed position is less than half the average distance between the damper longitudinal edges.

13. The air guide system of claim 12, wherein, in the central region of the damper axis, the minimum distance from the air-damper-side edge of the air guide wall to the damper axis of the associated air damper in the closed position is less than one-tenth the average distance between the damper longitudinal edges.

* * * * *